United States Patent [19]

Zimmer

[11] Patent Number: 4,736,645
[45] Date of Patent: Apr. 12, 1988

[54] GEAR UNIT FOR A MANIPULATOR

[75] Inventor: Ernst Zimmer, Friedberg, Fed. Rep. of Germany

[73] Assignee: Kuka-Schweissanlagen+Roboter GmbH, Augsburg, Fed. Rep. of Germany

[21] Appl. No.: 888,146

[22] Filed: Jul. 18, 1986

[30] Foreign Application Priority Data

Jul. 19, 1985 [DE] Fed. Rep. of Germany ....... 3525806

[51] Int. Cl.$^4$ .......................... F16H 1/14; B25J 17/02
[52] U.S. Cl. ....................................... 74/417; 901/16; 901/26
[58] Field of Search ................ 74/417, 665 L; 901/25, 901/26, 16

[56] References Cited

U.S. PATENT DOCUMENTS

| | | | |
|---|---|---|---|
| 4,068,536 | 1/1978 | Stackhouse | 901/26 X |
| 4,353,677 | 10/1982 | Susnjara et al. | 901/26 X |
| 4,402,234 | 9/1983 | Malarz et al. | 74/417 |
| 4,579,016 | 4/1986 | Soroka et al. | 74/417 X |
| 4,627,786 | 12/1986 | Minematsu et al. | 901/26 X |
| 4,642,021 | 2/1987 | Kikuchi | 901/26 X |
| 4,657,472 | 4/1987 | Zimmer | 901/26 X |
| 4,662,815 | 5/1987 | Zimmer | 901/26 X |
| 4,690,012 | 9/1987 | Dahlquist et al. | 74/417 X |

FOREIGN PATENT DOCUMENTS 2745932 6/1978 Fed. Rep. of Germany .
3428748 2/1985 Fed. Rep. of Germany .

Primary Examiner—Rodney H. Bonck
Attorney, Agent, or Firm—Karl F. Ross; Herbert Dubno

[57] ABSTRACT

The invention is a further development of the gear-head unit for a manipulator described in German Open Patent Application No. 34 28 748. In order to increase the radius of action and range of applicability of the gear-head unit a structural arrangement with three concentric drive axes and four allowed rotational motions of front, intermediate and rear segments of the manipulator is set forth. These front, intermediate and rear segments are pivotally mounted together about first and second inclined pivot axes which are inclined to each other and to the main drive shaft axis. Along these inclined pivot axes two hollow drive shafts connected with each other extend which are supported by reduction gears in the front and/or intermediate segments. Because of that simultaneous opposing rotational motions of the intermediate and rear segments can be obtained from a single drive motor. In the rear segment an output drive shaft attached to a front plate for a tool holder is rotatably mounted which is driven by coupled intermediate drive shafts guided through the hollow drive shafts.

9 Claims, 7 Drawing Sheets

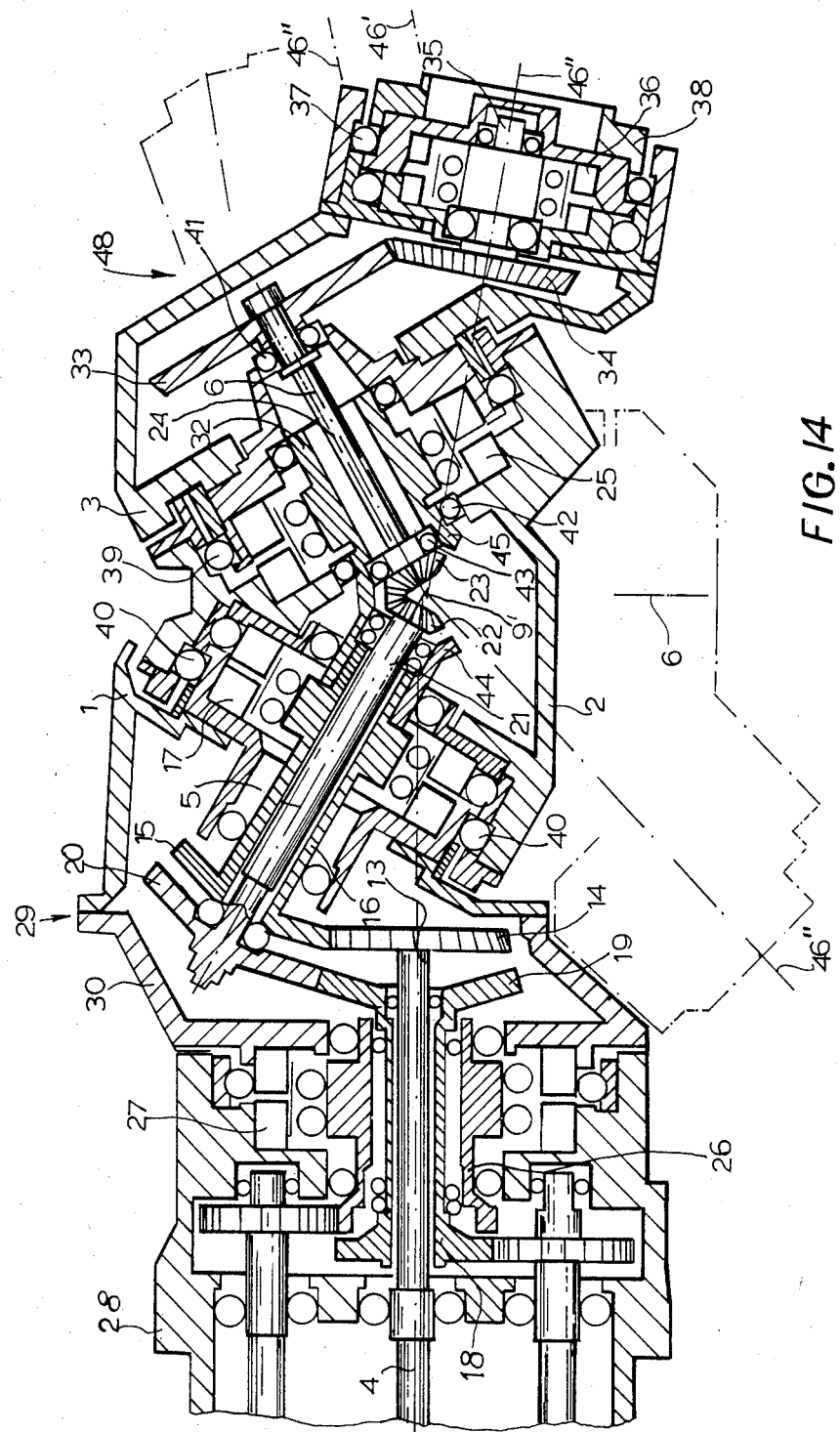

GEAR UNIT FOR A MANIPULATOR

FIELD OF THE INVENTION

My present invention relates to a gear unit for a manipulator, e.g. an arm of an industrial robot.

BACKGROUND OF THE INVENTION

A gear unit for a manipulator can comprise three segments mounted following each other and pivotable together with respect to each other about first and second inclined pivot axes with three drive shafts mounted concentric to each other, of which intermediate drive shafts are journaled along the first and second inclined pivot axes and which can have reduction gears associated with their output or driven side. The first and second inclined pivot axes form acute angles with the longitudinal axis of the manipulator arm, being inclined in opposite directions in the extended configuration of the arm.

German printed patent application DE-AS No. 27 45 932 described a gear unit for a manipulator having two segments mounted following each other which are pivotally mounted in planes inclined to each other. The tool holder on the rear gear segment is rotatably mounted on a pivot axis coaxial with the main drive shaft axis of the manipulator.

In the extended configuration of this manipulator gear head there are problems with the computationally controlled motion of the manipulator. A rotation predetermined by computer program of the tool held by the rear segment about the second inclined rotation axis is clearly allowed during computer control, if the gear unit is rotated about the axis of the concentric main drive shaft or if the rear segment is alone rotated about this axis. This ambiguity causes negative effects in continuous path control and up to now could only be overcome by programmed and/or control engineering manipulations to be sure unsatisfactorily. With point to point control the coaxial arrangement of the second inclined pivot axis with the concentric drive shaft is not a problem.

In German Open Patent Application DE-OS No. 34 28 748 three gear unit segments connected in cascade comprise the gear head unit for the manipulator. The intermediate or middle gear-head segment has two inclined pivot axes which form acute angles with the longitudinal axis of the gear head unit inclined in opposite directions. At the end of the intermediate gear shaft leading to this gear-head segment at least one large reduction gearing unit is mounted.

In one example, this gear-head unit has a substantially larger motion play in a compact structure. As a consequence of the inclined pivotability of the rear segment with respect to the intermediate segment an essentially larger operating range for the tool held by the manipulator is attained. Since, in this case, the output drive shaft is not coaxial with the main drive shaft the ambiguity in the calculational control is avoided.

OBJECTS OF THE INVENTION

It is an object of my invention to provide an improved gear-head unit for a manipulator which avoids drawbacks of the prior art.

It is also an object of my invention to provide an improved gear-head unit for a manipulator which allows an increased range of action thereof.

It is a further object of my invention to provide an improved gear-head unit for a manipulator which widens the range of possible uses of the gear unit.

It is another object of my invention to provide an improved gear-head unit for a manipulator having at least three gear-head unit segments which allows rotation of the tool held by the manipulator in the rear segment without rotating of the rear segment about its pivot axis.

SUMMARY OF THE INVENTION

These objects and others, which will become more readily apparent hereinafter, are attained in accordance with my invention in a gear-head unit for a manipulator comprising three gear segments mounted following each other and pivotable together with respect to each other about first and second inclined pivot axes having three drive shafts mounted concentrically whose gear-head unit driving members extend along the first and second inclined pivot axes to the gear-head segment to be driven and which have reduction gears associated with their output or driven sides. The first and second inclined pivot axes form acute angles with the longitudinal axis of the manipulator inclined in opposite directions in the extended configuration of the arm. An example of this gear-head unit is given in German Open Patent Application No. 34 28 748.

According to my invention, a drive unit comprising an output drive shaft, a reduction gear supported in the rear segment and a rotatably mounted front plate for a tool holder driven by the output drive shaft is mounted in the rear segment, and the gear-head unit driving members leading to the intermediate segment and to the rear segment comprise front and rear hollow drive shafts connected by a pair of second intermediate bevel gears through which two coupled intermediate drive shafts provided for driving the front plate extend.

My invention is able to perform four different rotational motions with three drive shafts positioned concentrically to each other, namely the rotation of the front gear-head segment about a main drive shaft axis, the rotation of the intermediate segment about the first inclined pivot axis with respect to the front gear segment, the rotation of the rear gear-head segment about the second inclined pivot axis with respect to the intermediate gear-head segment and the rotation of the tool holder in the rear gear segment.

My invention uses a first and second hollow drive shaft which extend along both of the inclined first and second pivot axes and are connected to each other by bevel gears and are driven by a single drive motor. Since these hollow shafts are supported by reduction gears in the front and/or intermediate segments, wherein the gears of the reduction gears are equal sized, and since the segments are mounted following each other, the rotation of the hollow drive shafts leads to a simultaneous but opposite rotation (or rotational moment) of the rear and intermediate segment about their inclined pivot axes. As a consequence these hollow shaft structures can provide a gear-head unit driving member to guide a drive shaft passing through the hollow shafts up to the final driven segment which is attached to the tool holder.

A gear-head unit also having three segments is taught in German Open Patent Application No. 34 31 033 which has an output drive shaft attached to a tool holder driven by a coaxial main drive shaft.

In this gear-head unit hollow drive shafts and bevel gears are used so that cable, tubing, electrical conductors and the like can be guided through the interior space of the gear unit. In this gear-head unit the rear segment is not directly driven but coupled by an inclined bevel gear toothed rim with a similar toothed rim on the front segment. Thus the point of engagement of the toothed rims is outside of the intermediate segment. If the intermediate segment is also rotated, the rear segment as a consequence of its mounting on the intermediate segment is required to follow this rotation.

Because of the point-by-point toothed engagement with the front segment, a rolling meshing motion of the rear segment occurs on the toothed rim of the unmoving front segment which leads to a wobbling of the rear segment. When on the contrary the front segment is rotated, the rear segment similarly performs an undesired rotational motion with approximately equal sized rotation angles. The self activated rotation is the result of the relative motion of the gear components mounted on each other and therefore influenced by them. Moreover, an increased influence of omission of gear teeth and gear teeth play on the spatial arrangement of the gear segments is noted, because in the above mentioned gear-head unit large reduction gears are not provided on the output side of the individual gear shafts which causes a reduction of the mistakes and the effect of the relative rotational motion.

In contrast, in my invention a substantial improvement is attained since the inwardly-lying oil bath lubricated gear teeth and support by the output side large reduction gears leads to a very compact structure with a higher precision which has a longer life. Relative rotational motions are effective only in reduced reduction gear ratios and compensated by the control devices.

With my invention the calculational ambiguity that is possible with the gear-head unit as disclosed by German Open Patent Application No. 34 28 748 is not possible and of course particularly when the front plate for the tool holder is rotatably driven on the rear segment.

According to a feature of my invention, to avoid calculational ambiguity, an output shaft axis of the output drive shaft can be positioned inclined to the main drive shaft axis, acute angles of both first and second inclined pivot axes with the main drive shaft axis in the intermediate segment can be unequal, or in an inclined arrangement the output shaft axis of the output drive shaft intersects the point of intersection of both first and second inclined pivot axes.

Also at least one of the first and second inclined pivot axes in the intermediate segment can be positioned in a plane which is inclined with respect to a longitudinal cross sectional plane of the manipulator. In one configuration extending from the longitudinal cross sectional plane the point of intersection of both first and second inclined pivot axes lies in the intermediate segment in the longitudinal cross sectional plane.

The intersection point of the inclined first and second pivot axes with the main drive shaft axis and the output shaft axis can in one embodiment be provided as the central point of a ball or universal joint.

BRIEF DESCRIPTION OF THE DRAWING

The above and other objects, features and advantages of my invention will become more readily apparent from the following specific description, reference being made to the accompanying highly diagrammatic drawing in which:

FIGS. 12 to 14 are longitudinal cross sectional views through three different embodiments of a gear-head unit for a manipulator according to my invention.

SPECIFIC DESCRIPTION

Figure 1:
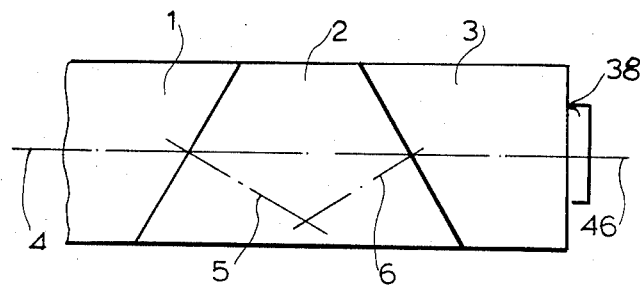
FIG. 1 is a diagrammatic side view of the gear-head unit for a manipulator showing the relationship of the various components of the gear-head unit and their axes of rotation in its extended position.

The gear-head unit illustrated in FIG. 1 here corresponds to that of FIG. 1 of German Open Patent Application No. 34 28 748 and shows that an ambiguity for automatic control exists when a front plate 38 and/or tool holder in the rear segment 3 of the gear-head unit is mounted so that it is pivotable about an output shaft axis 46 coaxial to main drive shaft axis 4 and is rotated. Then the rotation of the tool about the output shaft axis 46 could also be possible by rotation of the front segment 1 of the gear-head unit about the main drive shaft axis 4. This ambiguity could be avoided only in cases where the front segment 1 can be nonrotatably mounted about the main drive shaft axis 4.

Intermediate segment 2 of the gear-head unit can rotate about inclined pivot axis 5 with respect to front segment 1 and about inclined pivot axis 6 with respect to rear segment 3.

Figure 2:
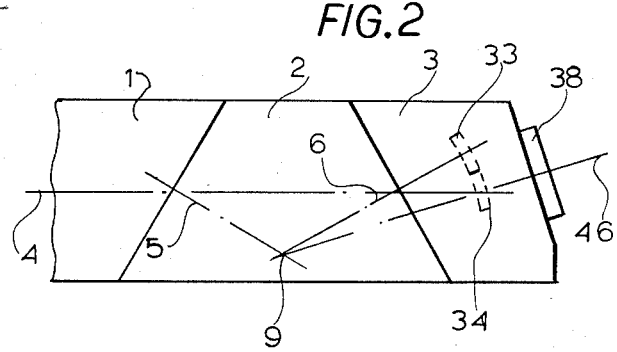
FIG. 2 is a diagrammatic side view of the apparatus according to FIG. 1 with a power take off inclined to the main drive shaft axis.

FIG. 2 shows one way to avoid the abovementioned ambiguity. The output shaft axis 46 is inclined at an acute angle to the main drive shaft axis 4. Advantageously the output shaft axis 46 intersects both inclined axes 5 and 6 at the point of intersection 9 in order to make easy the computer control of the motion process. A pair of rear bevel gears 33 and 34 drive the front plate 38. Should a rotation of the front plate 38 or tool holder about the output shaft axis 46 occur, the drive for the front segment is not enabled. Thus ambiguity is avoided.

Figure 3:
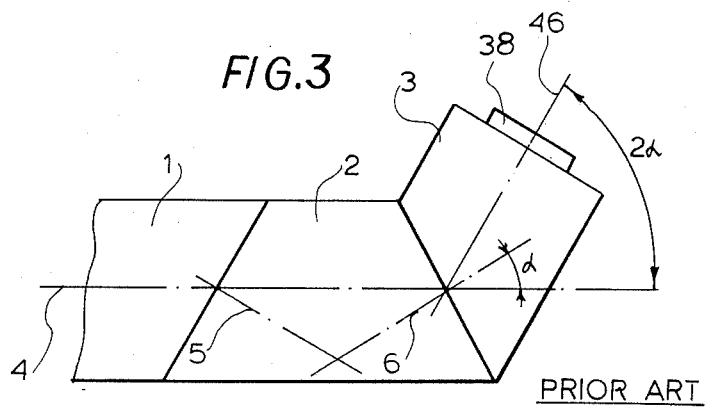
FIGS. 3 and 4 are side views of the gear-head unit of FIG. 1 in corresponding similar pivoted positions.
Figure 4:
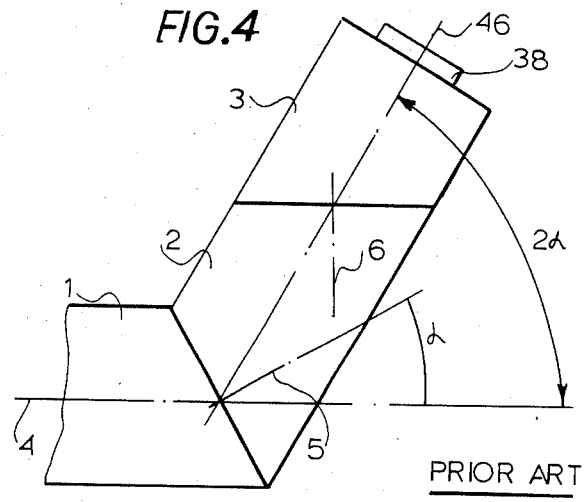

FIGS. 3 and 4 here correspond to the FIGS. 2 and 4 of German Open Patent Application DE No. 3428 748. One sees that in each case the rear segment 3 is pivotable about an angle ($2\alpha$) with respect to the main drive shaft axis 4. Different rotational drives can be used. In the first case the rear segment 3 is rotatable about 180° with respect to the fixed intermediate segment 2. In the second case the intermediate segment 2 is rotatable about 180° with respect to the front segment 1 while the rear segment 3 remains in the same position on it.

The ambiguity referred to above may be removed in accordance with the invention as illustrated in FIGS. 5 to 11.

Figure 5:
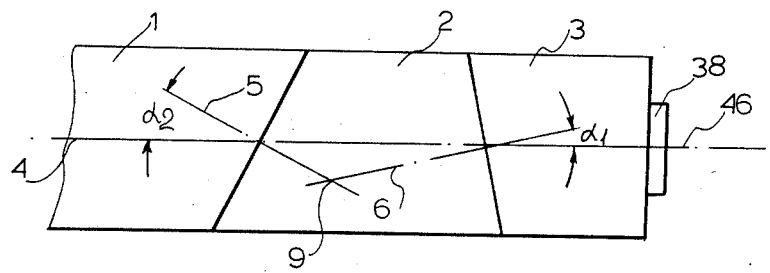
FIGS. 5 to 11 are side views of different embodiments of the gear-head unit for a manipulator according to my invention with rotation axes for their components inclined to the main drive shaft and arranged in different ways.

In the example of FIG. 5 the angle ($\alpha_1$) and the angle $\alpha_2$) of the inclined axes 5 and 6 are not the same size so that the point of intersection 9 is displaced laterally from the symmetric position shown in FIG. 1. The same rotations of the intermediate and rear segments 2 and 3 lead to different angular configurations of the manipulator.

Figure 6:
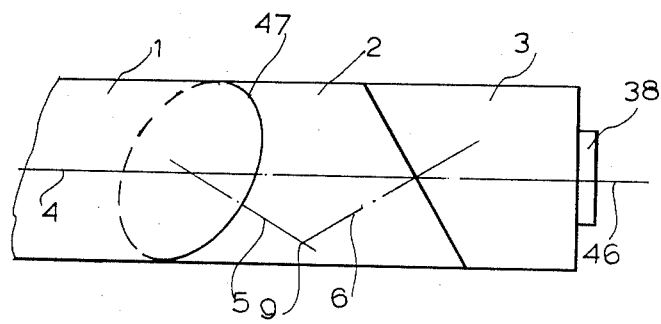

In FIG. 6, the inclined pivot axis 5 is inclined to the plane of the drawing so that the point of intersection 9 of both inclined pivot axes 5 and 6 remains in the plane of the drawing (a longitudinal plane of the gear unit). The ellipse 47 symbolizes the inclined rotation plane along which both front and intermediate segments 1 and 2 extend together.

Figure 7:
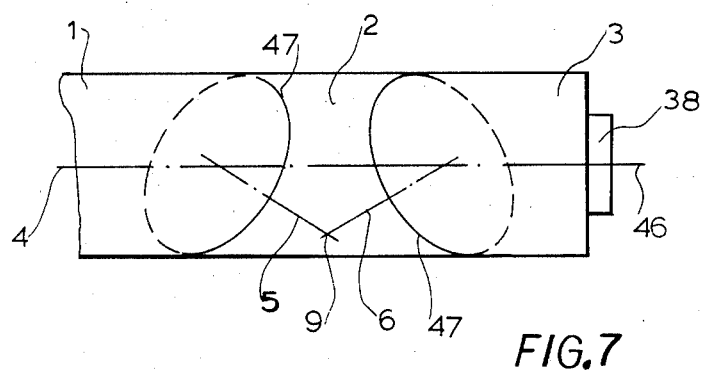

FIG. 7 shows an embodiment in which this concept is further developed. Here both inclined axes 5 and 6 are inclined from the plane of the drawing. Taken together the embodiments of FIGS. 5 to 7 show that it is possible to avoid the ambiguity in the embodiments of FIGS. 3 and 4. In case of FIG. 7 the point of intersection 9 of the inclined pivot axes 5 and 6 is positioned off the main drive shaft axis 4 but also in the plane of the drawing.

Figure 8:
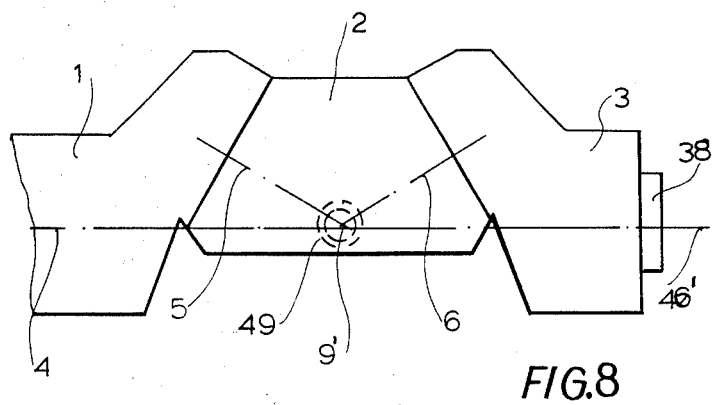

A significant easing of the work required for the automatic control of the motions thus results when the point of intersection 9' of the inclined pivot axes 5 and 6 lies on the main drive shaft axis 4 and when the output shaft axes 46', 46" or 46"' intersects these points of intersection 9'. To make this clear, it should be mentioned that in the embodiments of FIGS. 8 to 11 the output shaft axis 46 acquires the reference number 46' when it lies coaxial to the main drive shaft axis 4 and intersects the point of intersection 9' (FIGS. 8 and 10). It acquires the reference number 46" when it forms an angle with the main drive shaft axis 4; however it also intersects the point of intersection 9' (FIGS. 9 and 10).

In the structure according to FIG. 8 the embodiment is developed further so that the first and second inclined pivot axes 5 and 6 are displaced laterally in the front and rear segment 1 and 3 until their axes intersect the main drive shaft axis 4.

Figure 9:
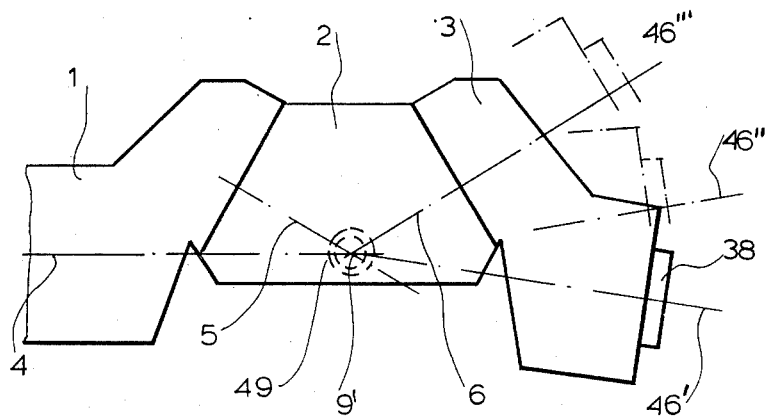
Figure 10:
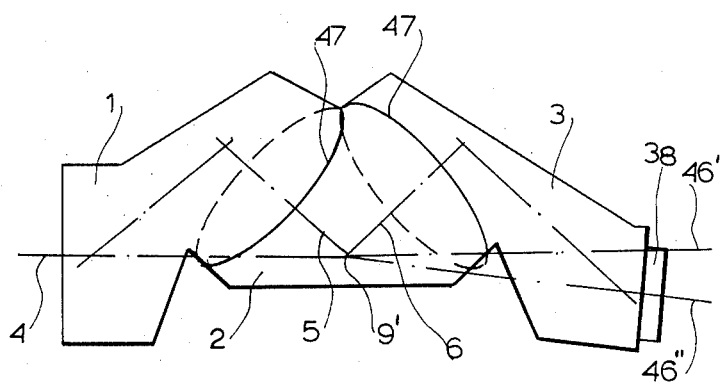

In the example of FIG. 9, the inclined position of the output shaft axis 46' to the main drive shaft axis 4 is shown, which—as has been said—avoids the ambiguity of the control of these axes. The output shaft axis 46" can be brought into coincidence with the second inclined pivot axis 6 and is shown there as output shaft axis axis 46"' which suffices for a reduction of the gear transmission elements and thus expenses and a reduction of the motion play. A damaging calculational ambiguity is not possible because of the coincidence of the output shaft axis 46" and the second inclined pivot axis 6 because on simultaneous gear coupling of the first and second inclined pivot axes 5 and 6 they do not function as a single pivot axis.

In the embodiments of FIGS. 8 and 9 the axes 4, 5, 6, 46, 46", and 46"' lie in the extended configuration of the gear-head unit in the drawing plane. In the case of FIG. 8, the ambiguity in the embodiment of FIGS. 3 and 4 could not be eliminated.

As can be seen from FIGS. 6 and 7, this ambiguity may be removed by inclining the first and second inclined pivot axes 5 and 6 to the plane of the drawing. This step together with the coaxial positioning of the point of intersection 9' of the axes 4, 5, 6, 46', 46", and 46"' leads to the embodiment of FIGS. 10 and 11.

Figure 11:
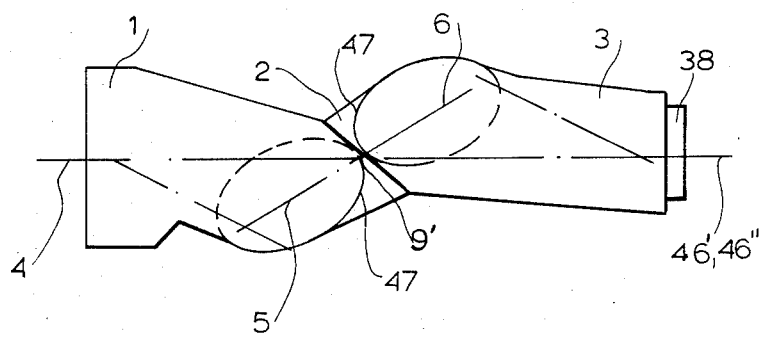

FIGS. 10 and 11 show an embodiment of FIG. 7 in a side and a top view. In this embodiment the individual front, intermediate and rear segments 1, 2, and 3 have laterally projecting housing members for mounting the first and second inclined pivot axes 5 and 6 projecting to the front and rear and the intersection point 9' of these first and second inclined pivot axes 5 and 6 lies in the plane of the drawing and is the common end point of the axes 4, 46' and 46". This has the consequence that it does not lie aligned with the main drive shaft axis 4 in the plane of the drawing. Thus the abovementioned calculational ambiguity is not possible.

The point of intersection 9' shown in FIGS. 8 to 11 for the axes 4, 5, 6, 46', 46", and 46"' can be the center point of a ball or universal pivot joint 49, by which the main drive shaft axis 4 is spatially connected with the output shaft axes 46', 46", and 46"'. This ball or universal joint 49 is shown symbolically.

Figure 12:
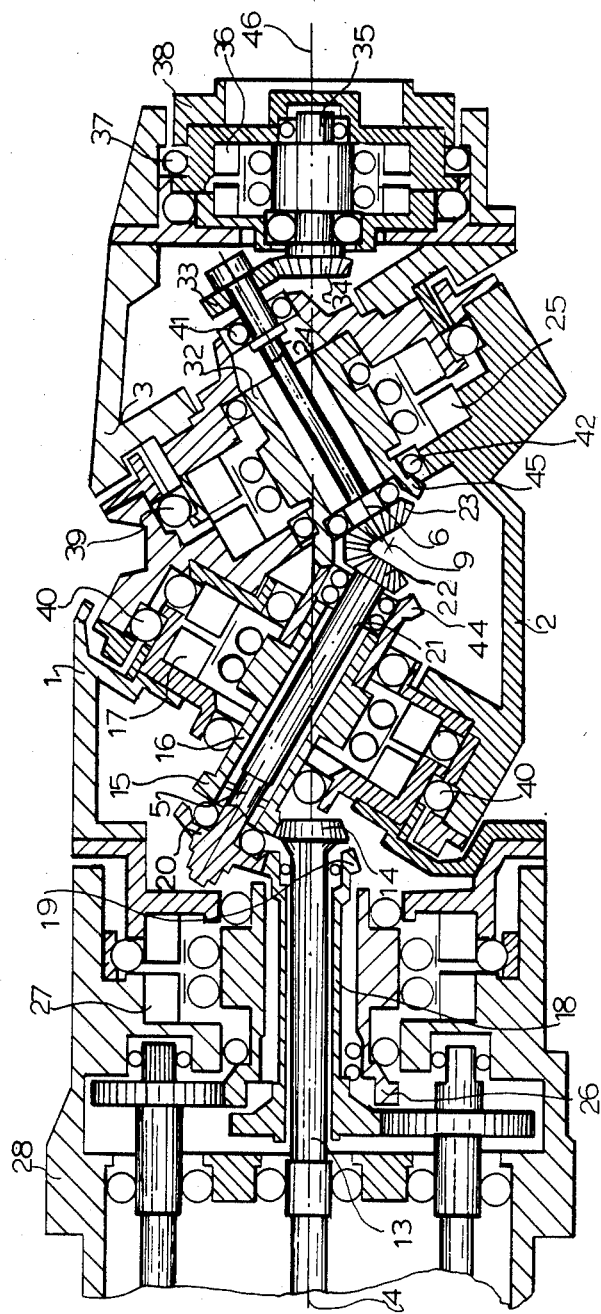
Figure 13:
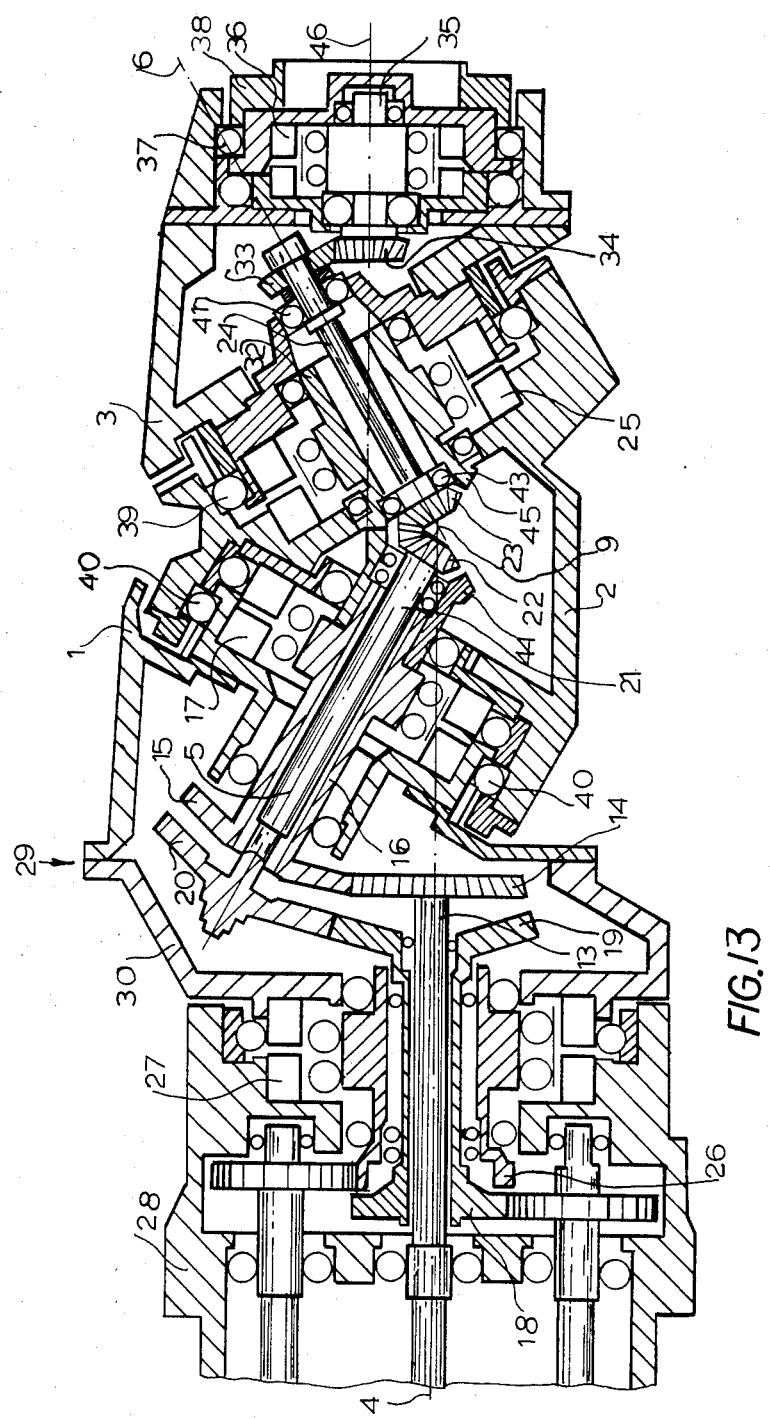

FIGS. 12 to 14 show three different structural arrangements for driving the front plate 38 for the tool holder. In FIG. 12 the output shaft 46 is coaxial and in FIG. 13 parallel to the main drive shaft axis 4. FIG. 14 shows structure corresponding to the example given in FIGS. 8 and 9. The point of intersection 9' of the first and second inclined pivot axes 5 and 6 is the common end point of the axes 4, 46', 46", and 46"'.

The inclined arrangement of the driven drive shaft 35 lying on the output shaft axes 46', 46" and 46"' is principally advantageous in the so-called course-or path-controlled manipulator to avoid the calculational ambiguity mentioned above. In this structural embodiment an inner base drive shaft 13 is connected by a pair of first front bevel gears 14 and 15 with a first hollow drive shaft 16 which is connected by a front reduction gear 17 with the intermediate segment 2. This intermediate segment 2 is rotatable about the first inclined pivot axis 5 by this bevel gear arrangement 14 and 15. It is guided by an appropriate bearing 40 in the front segment 1 about a perpendicular plane to the first inclined pivot axis 5.

The outer drive shaft 26 acts directly on the front segment 1 by the base reduction gear 27 which is mounted coaxially to the supporting base 28 and is mounted pivotally in it. Collectively the reduction gears are mounted so that the gear-head unit structure is free from play, spatially compact and thus comparatively small. These reduction gears 17, 25, 27 and 36 are provided for large reduction ratios.

Along the second inclined pivot axis 6 a rear hollow drive shaft 32 is mounted which is connected with the front hollow drive shaft 16 preceding it by the bevel gears 44 and 45. The front hollow drive shaft 16 drives the intermediate segment 2 about the first inclined pivot axis 5 by the front reduction gear 17 which is supported on the front segment 1. The other rear hollow shaft 32 is supported on the intermediate segment 2 with the intermediate reduction gear 25 and drives the rear segment 3 about the second inclined pivot axis 6. Both reductions by the reduction gears 17 and 25 are equally large and are advantageously structured to be mirror images of each other which has the consequence that the intermediate and rear segments 2 and 3 supported on each other execute a simultaneous but opposite rotational motion on rotation of the front and rear hollow drive shafts 16 and 32.

In this way it is possible to feed drive shafts 21 and 24 through the front and rear hollow drive shafts 16 and 32 which extend from the outer base drive shaft 18 and the first intermediate bevel gears 22 and 23 and the rear bevel gears 33 and 34 act to drive output drive shaft 35 which is supported in the rear segment 3 by a rear reduction gear 36. Because of that the front plate 38 is rotated which is guided by the bearing 37 in the rear segment 3 and receives the tool.

The rear segment 3 is rotatably guided by the bearing 39 in the intermediate segment 2 which is mounted with the bearing 40 on the front segment 1. The intermediate shaft 24 is guided on its driving side in the rear segment 3 by the bearing 41 and on its driven side by the bearing 43 on the rear hollow shaft 32, which is supported by the bearing 42 on the intermediate segment 2.

In FIG. 12 the point of intersection 9 of the inclined axes is provided on one side away from the main drive shaft axis 4. This point of intersection can however also lie on the main drive shaft axis 4 as shown in FIG. 13. Then in this embodiment a staggering of the intermediate member 29 is brought about with the lateral cover plates 30 and 31.

The consequence of this is that the lateral staggering of the drive shaft 35 is parallel to the main drive shaft axis 4. If one wants to avoid this embodiment for point to point control, one can provide for the support of the output drive shaft 35 which increases the lateral displacement and thus guarantees that the driven output shaft 35 lies in the extended configuration of the gear-head unit coaxial for the main output drive shaft 4. FIG. 14 shows a construction for the path-controlled manipulator which avoids the calculational ambiguity mentioned above in which the inclined position of the drive axis 46″ is advantageous. The drive axis 46′—FIG. 14—shows a set back 48 of the output drive shaft 35 according to FIG. 13.

The inclined configuration of the output shaft axis 46″—as shown in FIG. 14—is directed below, but also—as indicated with dot-dashed lines is directed upwardly. A spatially inclined configuration, for example into the drawing plane and out of it, is possible and could be used also.

By definition the front plate drive unit comprises an output drive shaft 35, a rear reduction gear 36 supported in the rear segment 3 and a rotatably mounted front plate 38 driven by the output drive shaft 35.

By gear-head unit driving members are meant drive trains with shafts on which gears are mounted which change the configuration of the manipulator. This particularly includes the hollow drive shafts 16 and 32.

I claim:

1. A gear-head unit for a manipulator comprising:
    a first segment provided with three coaxial drive shafts;
    an intermediate segment rotatable relative to said first segment about a first pivot axis inclined to the common axis of said drive shafts;
    a third segment rotatable about a second pivot axis relative to said intermediate segment and inclined to said first pivot axis;
    a plate rotatable on said third segment about an axis inclined to said second pivot axis, said segments being orientable in an extended position of said unit whereby said unit has a longitudinal axis, said first and second pivot axes including with said longitudinal axis in said extended position of said unit, acute angles opening in opposite directions;
    a first hollow shaft connected to one of said drive shafts and centered on said first pivot axis and a second hollow shaft centered on said second pivot axis journaled in said intermediate segment and coupled directly by a first pair of bevel gears;
    a first reduction gear connecting said second hollow shaft with said third segment for rotating same about said second pivot axis relative to said intermediate segment;
    a first central shaft in said first hollow shaft and a second central shaft in said second hollow shaft directly interconnected by a second pair of bevel gears and driven by another of said drive shafts; and
    a second reduction gear in said third segment driven by said second central shaft and connected to said plate for rotating same relative to said third segment.

2. The gear head unit defined in claim 1 wherein the remaining one of said drive shafts is connected to said intermediate segment by a third reduction gear, for rotating said intermediate segment about said first pivot axis relative to said first segment.

3. The gear head unit defined in claim 1 wherein two of said segments are connected to one of said drive shafts.

4. The gear head unit defined in claim 1 wherein said hollow shafts are provided with two reduction gears respectively on said first segment and said intermediate segment.

5. The gear head unit defined in claim 1 wherein said plate axis is inclined to said common axis.

6. The gear head unit defined in claim 1 wherein said acute angles differ from one another.

7. The gear head unit defined in claim 1 wherein both of said pivot axes lie in a common plane.

8. The gear head unit defined in claim 1 wherein one of said pivot axes is inclined to a common plane of the other pivot axis and said common axis.

9. The gear head unit defined in claim 1 wherein said pivot axes intersect said common axis and said plate axis at the center of a universal joint.

* * * * *